United States Patent
Oyama et al.

(10) Patent No.: US 6,572,990 B1
(45) Date of Patent: Jun. 3, 2003

(54) TRANSPORTATION EQUIPMENT WINDOW ANTIREFLECTION FILM, GLASS WITH ANTIREFLECTION FILM, LAMINATED GLASS AND PRODUCTION METHOD THEREFOR

(75) Inventors: Takuji Oyama; Kazuyoshi Noda; Yoshihito Katayama; Yukio Kimura, all of Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/600,152
(22) PCT Filed: Nov. 29, 1999
(86) PCT No.: PCT/JP99/06653
§ 371 (c)(1),
(2), (4) Date: Jul. 31, 2000
(87) PCT Pub. No.: WO00/33110
PCT Pub. Date: Jun. 8, 2000

(30) Foreign Application Priority Data
Nov. 30, 1998 (JP) .................................... 10-340291

(51) Int. Cl.[7] ....................... B32B 17/06; C03C 27/06
(52) U.S. Cl. ....................... 428/698; 428/216; 428/428; 428/702; 156/99; 156/106; 359/359; 359/580; 359/586
(58) Field of Search ................ 428/216, 428, 428/432, 433, 469, 472, 702, 698; 359/359, 360, 580, 585, 586; 204/192.1; 156/99, 106

(56) References Cited

U.S. PATENT DOCUMENTS

| | | |
|---|---|---|
| 5,691,044 A | 11/1997 | Oyama et al. |
| 5,942,319 A | 8/1999 | Oyama et al. |
| 5,976,684 A | 11/1999 | Oyama et al. |

FOREIGN PATENT DOCUMENTS

| | | |
|---|---|---|
| JP | 4-357134 | 12/1992 |
| JP | 4-357135 | 12/1992 |
| JP | 9-156964 | 6/1997 |
| JP | 10-87348 | 4/1998 |
| JP | 10-96801 | 4/1998 |
| JP | 11-509513 | 8/1999 |
| JP | 11-292568 | 10/1999 |
| WO | WO 97/43224 | 11/1997 |

*Primary Examiner*—Deborah Jones
*Assistant Examiner*—Jennifer McNeil
(74) *Attorney, Agent, or Firm*—Oblon, Spivak, McClelland, Maier & Neustadt, P.C.

(57) ABSTRACT

An antireflection film for a window of a transport, which comprises a light absorbing film consisting essentially of a nitride and having a film thickness of from 3 to 12 nm, and an oxide film having a refractive index of from 1.45 to 1.70 and a film thickness of from 70 to 140 nm, formed in this order on a substrate, and which has adequately low reflection performance to the oblique incident light, an adequate abrasion resistance and a high transmittance of visible light, a glass provided with said film, a laminated glass and its production process.

45 Claims, 11 Drawing Sheets

F I G. 11
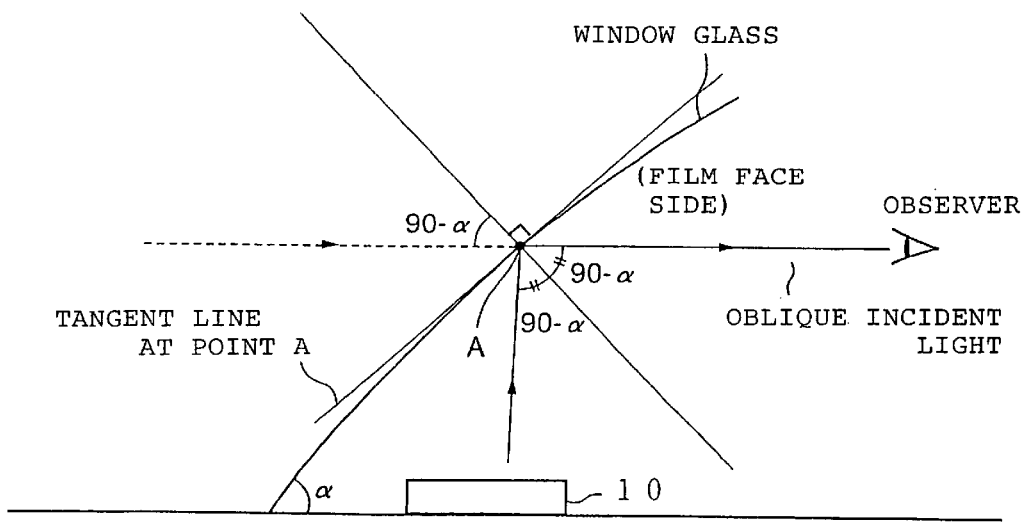

TRANSPORTATION EQUIPMENT WINDOW ANTIREFLECTION FILM, GLASS WITH ANTIREFLECTION FILM, LAMINATED GLASS AND PRODUCTION METHOD THEREFOR

This application is a 371 of PCT/JP99/06653, filed Nov. 29, 1999.

TECHNICAL FIELD

The present invention relates to an antireflection film for a window of a transport, a glass provided with an antireflection film for a window of a transport, a laminated glass provided with an antireflection film for a window of a transport and its production process. Particularly, it relates to a light absorptive antireflection film which reduces reflection of oblique incident light, a glass for an automobile using said antireflection film, a laminated glass for an automobile and its production process.

BACKGROUND ART

Conventionally, since the reflectance of visible light (hereinafter referred to simply as reflectance) from the film face side (interior side) of a windshield of an automobile is high, the color tone of e.g. the interior has been limited to one based on dark tone color (such as black), in order to suppress reflection of the dashboard and its surrounding, and to increase visibility of the driver. That has significantly restricted, the color of the car interior, and significantly limited the design of an automobile.

In recent years, the setting angle of a windshield tends to be acute, from the viewpoint of the appearance design, and accordingly, the problem of the reflection on the interior face tends to be more significant.

Accordingly, it has been required to reduce the reflectance on the interior face of a windshield and to increase the allowable range of the interior design.

As a method to achieve such requirements, it has been known to form an antireflection (hereinafter sometimes referred to simply as AR) film on the surface of a windshield. For example, the following methods such as 1) a method of forming a transparent multi-layer AR film, and 2) a method of forming a transparent single-layer AR film, have been proposed.

The method 1) is to form a known multi-layer AR film by vacuum deposition or sputtering. However, since the total film thickness is so thick as at least about 250 nm, the cost required for the production is high, and further, coating is required on both inside and outside the car to obtain an adequate AR function, such being problematic. Further, since the outside of the car is always abraded by wipers, an extremely high abrasion resistance is required, but the abrasion resistance is inadequate with conventionally known film materials.

In the method 2), in the case of the vacuum deposition, $MgF_2$ may be coated. However, it is necessary to form a film on a hot substrate in order to let $MgF_2$ have an adequate strength, and stability of the film thickness distribution which is characteristic of the deposition is inadequate, such being problematic in productivity. Further, the problem of the abrasion resistance on the outside of the car is similar to the case of the method 1). In recent years, a single-layer AR film having a high strength has been developed by using porous $SiO_2$ (porous silicon oxide). However, the abrasion resistance on the outside of the car is inadequate, and dirt attached to the pores during long-term use is less likely to be removed.

On the other hand, as a low-reflection film for CRT, a new type multi-layer AR film comprising a light absorbing film as a constituent has been proposed (JP-A-64-70701, U.S. Pat. No. 5,091,244). With this multi-layer AR film, the visible reflectance on the surface can be made 0.3% or less, the sheet resistance of the surface can be made 1 kΩ/□ or less, and further, the electromagnetic wave-shielding effect can be imparted. Further, since a light absorbing film is used, the entire transmittance of visible light (hereinafter sometimes referred to simply as transmittance) will decrease, whereby the contrast can be increased. However, if this multi-layer AR film for CRT is directly applied to a windshield for an automobile, the desired effect can rarely be obtained. Namely, as mentioned above, a windshield for an automobile is set in a significantly slanted state, and accordingly, with the film constitution for CRT which is designed for incident light at right angles, no adequate AR performance will be obtained, or the reflection color tone tends to be yellowish or reddish, such being problematic.

Further, a windshield for an automobile is required to shield the direct solar radiation light as much as possible from the viewpoint of the temperature in the car, and a green type heat absorbing glass is mainly used at present. This glass slightly reduces transmittance at the visible light region. Accordingly, also in the case of using the above AR film comprising a light absorbing film, it is preferred to make the transmittance as high as possible and to use it together with a heat absorbing glass.

However, with respect to a conventionally known absorptive type AR film for CRT, the transmittance is considered to be preferably low in order to improve the contrast, which is one reason to make it difficult to apply the film to a windshield for an automobile.

As another example of the AR film for CRT, a four layer constitution of glass/transition metal nitride/transparent film/transition metal nitride/transparent film, has been known (U.S. Pat. No. 5,091,244). However, this multi-layer AR film is designed to have a transmittance of visible light of 50% or less, and further, the absorbing layer is divided into two layers to make the number of layers at least four layers to achieve this, and thus many steps are required.

Production of a windshield for an automobile most advantageously comprises coating on a flat glass substrate, followed by cutting, bending and lamination. However, although it is described that the conventional AR film for CRT may resist heat treatment after coated on a panel glass (such as heat treatment in the frit seal step) (JP-A-9-156964), the temperature for the heat treatment is a level of 450° C., and no result of studies has been shown with respect to a high temperature of from 560 to 700° C. in the step of bending in production of a windshield for an automobile.

The present invention has been made to overcome the above-described drawbacks of the prior art and to provide an antireflection film for a window of a transport, having an adequately low reflection performance to oblique incident light (particularly oblique incident light at an angle of a level of 60°), an adequate abrasion resistance and a high transmittance of visible light, and a glass provided with an antireflection film for a window of a transport comprising said antireflection film (particularly a glass for an automobile provided with an antireflection film and a laminated glass for an automobile provided with an antireflection film).

The present invention further provides an antireflection film for a window of a transport which presents neutral reflection color tone (color tone close to colorless) to oblique incident light (particularly oblique incident light at an angle of a level of 60°) and a glass provided with an antireflection film for a window of a transport comprising said antireflection film (particularly a glass for an automobile provided with an antireflection film and a laminated glass for an automobile provided with an antireflection film).

Further, it is an object of the present invention to provide an antireflection film for a window of a transport which adequately resists heat treatment (such as heat treatment in the bending step or the tempering step) in production of a glass for an automobile and which is excellent in productivity at a low cost, and a glass provided with an antireflection film for a window of a transport comprising said antireflection film (particularly a glass for an automobile provided with an antireflection film).

Further, it is an object of the present invention to provide a laminated glass provided with an antireflection film for a window of a transport, comprising the above antireflection film (particularly a laminated glass for an automobile provided with an antireflection film), and a production process to easily obtain a laminated glass provided with an antireflection film for a window of a transport.

DISCLOSURE OF THE INVENTION

The present invention has been made to overcome the above-described problems, and provides an antireflection film for a window of a transport, which comprises a light absorbing film consisting essentially of a nitride and an oxide film having a refractive index of from 1.45 to 1.70 formed on a substrate in this order on the substrate, wherein the geometrical film thickness of the light absorbing film is from 3 to 12 nm, and the geometrical film thickness of the oxide film is from 70 to 140 nm (a first invention).

BRIEF DESCRIPTION OF THE DRAWINGS

FIG. 11 is an explanatory diagram with respect to incident light at an oblique angle in the present invention.

BEST MODE FOR CARRYING OUT THE INVENTION

Figure 1:
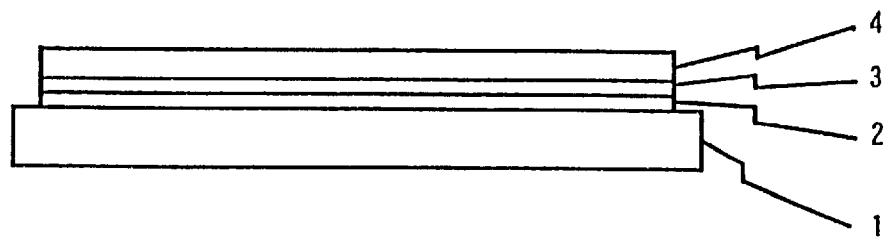
FIG. 1 is a schematic sectional view illustrating the glass provided with an antireflection film for a window of a transport of Example 1.

The first invention has a constitution consisting essentially of two layers, but a "barrier film" to prevent oxidation of the light absorbing film, is preferably formed between the light absorbing film and the oxide film.

The barrier film has a function to prevent the light absorbing layer formed thereunder from being oxidized in after-heating treatment. This is because the barrier film itself contains substantially no oxygen (differently from the oxide film), and in the case where oxygen in the oxide layer formed thereon or oxygen in the air is diffused through the oxide layer, part of the barrier film itself is oxidized, to prevent further invasion of oxygen.

As the barrier film, a transparent nitride film having a geometrical film thickness of from 1 to 20 nm is preferably formed. In addition to the transparent nitride film, e.g. a film made of at least one metal selected from the group consisting of Si, Ti, Ni—Cr and Zn may be used. The barrier film made of a metal has a geometrical film thickness of preferably from 1 to 10 nm.

The barrier film has substantially no optical significance, but it has a function to impart heat resistance against heat treatment after the film formation (hereinafter referred to simply as after-heat treatment) such as after-heat treatment in the bending step or the tempering step in production of a glass for an automobile.

The present invention further provides an antireflection film for a window of a transport, which comprises a light absorbing film consisting essentially of a nitride, a transparent film having a refractive index of from 1.90 to 2.40, and an oxide film having a refractive index of from 1.45 to 1.70, formed on a substrate in this order on the substrate, wherein the geometrical film thickness of the light absorbing film is from 3 to 12 nm, the geometrical film thickness of the transparent film having a refractive index of from 1.90 to 2.40 is from 40 to 80 nm, and the geometrical film thickness of the oxide film is from 70 to 140 nm (a second invention).

The second invention has a constitution consisting essentially of three layers, and the presence of the transparent film of from 40 to 80 nm having a refractive index of from 1.90 to 2.40 (hereinafter referred to simply as transparent film) will increase the antireflection effect to oblique incident light. Further, at the same time, the heat resistance against the after-heat treatment will increase.

The transparent film is not particularly limited so long as it is made of a material having a refractive index of from 1.90 to 2.40 at a wavelength of 550 nm. For example, an oxide, a nitride or an oxy-nitride of at least one element selected from the group consisting of Zn, Sn, Ti, Zr, Si, Al, In, Ta, Nb, Bi, W and B, may be mentioned. Particularly preferred is a transparent nitride film.

The antireflection film of the present invention is formed preferably on the interior (car interior) side face. For example, when it is used for a laminated glass for a windshield of an automobile consisting of an exterior-side glass substrate and an interior-side glass substrate, it will be formed on the interior side face of the interior-side glass substrate.

FIG. 11 is an explanatory diagram with respect to incident light at an oblique angle in the present invention. When the setting angle of a glass plate to a transport is α°, and the line of sight of an observer (driver) is in the horizontal direction (the observer gazes into the infinite distance), the line of sight of the observer and the glass plate cross each other at point A, and the angle formed by the line of sight of the observer and the line perpendicular to the tangent line of the glass plate at point A is about (90-α)°.

On the other hand, interior light (such as light around the dashboard 10) incident at an angle of about (90-α)° at the point A will reach the observer, according to Snell laws of reflection.

The angle of incidence of light usually means the angle formed by the direction perpendicular to the reflection plane and the direction of the incident light. In a case where the setting angle of the glass plate is α°, the angle of incidence of light from the film face side (interior side) is about (90-α)°. For example, when the setting angle a is 30°, the incident light from the film face side is an incident light at an angle of 60°. Further, the angle of an oblique incident light (dotted line in FIG. 11) from the non-film face side (the side on which no film is present) is also represented by the angle formed by a line perpendicular to the tangent line of the glass plate, i.e. about (90-α)°.

The light absorbing film in the present invention (the first and second inventions) slightly reduces the transmittance, and reduces direct solar radiation heat. Further, when the present invention is applied to a glass for an automobile, the intensity of the reflected light of light from the interior side on the exterior-side glass face will be doubly weakened, and as a result, the contrast in the field of view will be increased and the visibility of a driver will be increased.

The light absorbing film has an extinction coefficient of preferably at least 0.05 (particularly preferably at least 0.5) at the visible light region. The light absorbing film is preferably a film consisting essentially of at least one metal selected from the group consisting of titanium, zirconium and hafnium, or a film consisting essentially of a nitride of the above metal, from the viewpoint of the dispersion relation of the extinction coefficient and the refractive index at the visible light region. Each of the described films may widen the low-reflection region at the visible light region. It is particularly preferably a film consisting essentially of a nitride of a metal.

The film consisting essentially of a nitride of a metal may contain a slight amount of oxygen in the film. The content of oxygen significantly influences on the optical constant, and influences on the antireflection property of the antireflection film to be obtained as a final product, and the antireflection property tends to be poor in either case where the oxygen content is too high or too low. In the nitride of a metal in the film, the proportion (ratio in atom) of oxygen to said metal is preferably at most 0.5. It is particularly preferably at least 0.11.

As the nitride of a metal, titanium nitride is preferred. Titanium nitride is preferred since 1) it is low-priced, 2) a film can stably be formed, 3) it is excellent in chemical and mechanical durability, and 4) the value of the optical constant at the visible light region well matches the transparent nitride film (particularly silicon nitride film) and the oxide film (particularly silicon oxide film) having a refractive index of from 1.45 to 1.70, to be formed on the light absorbing film, to reduce the reflectance, and at the same time, the value of the absorption coefficient is appropriate, and the geometrical film thickness (hereinafter referred to simply as film thickness) to obtain an appropriate light absorption will be within a range of from several nm to several tens nm, such being preferred from the viewpoint of both productivity and reproducibility.

Titanium nitride is formed into a film preferably by direct-current sputtering of a metal titanium target in the presence of a nitrogen gas, from the viewpoint of productivity. A small amount of impurities may be incorporated in the target or sputtering gas composition so long as the film to be obtained substantially has the optical constant of titanium nitride.

With respect to titanium nitride, the proportion (ratio in atom) of nitrogen to titanium in the film is preferably from 0.5 to 1.5 from the viewpoint of the optical constant and the specific resistance. If it is less than 0.5, a rather metallic titanium nitride film will be obtained, and the specific resistance will be low, but the optical constant will be inappropriate, and the antireflection effect tends to be inadequate. If it exceeds 1.5, a nitrogen-excessive titanium nitride film will be obtained, and the optical constant may change, whereby the antireflection effect tends to be inadequate. Further, with respect to titanium nitride, the proportion (ratio in atom) of oxygen to titanium in the film is preferably at most 0.5 from the viewpoint of the optical constant and the specific resistance. If it exceeds 0.5, an oxy-nitride titanium film will be obtained, and the optical constant will be inappropriate, whereby the antireflection effect tends to be inadequate.

It is important that the film thickness of the light absorbing film is from 3 to 12 nm so as to achieve low-reflection of oblique incident light while maintaining a high transmittance. It is particularly preferably from 3 to 10 nm, more preferably from 3 to 9 nm, furthermore preferably from 3 to 8 nm, and still furthermore preferably from 3 to 5 nm.

To suppress the electromagnetic wave-shielding effect in order to cope with e.g. portable telephones in a car or automatic accounting system, the surface resistance is preferably at least 1.0 kΩ/□, particularly preferably at least 2 kΩ/□. In the present invention, the light absorbing layer is preferably designed to be partially oxidized by the after-heat treatment to have the above surface resistance.

The oxide film in the present invention (the first and second inventions) reduces the reflectance by the optical interference with the light absorbing layer, and at the same time, increases the durability of the entire antireflection film by a relatively thick film thickness and a high durability of the oxide film itself.

As the oxide film, a film consisting essentially of an oxide of silicon (Si) is preferred since it has a high durability and a low refractive index. Particularly preferred is a silicon oxide film (refractive index of from about 1.45 to about 1.48 at a wavelength of 550 nm).

In addition, one consisting essentially of an oxide of aluminum (Al), or one consisting essentially of oxides of Si and Al, may, for example, be mentioned.

The silicon oxide film is formed preferably by direct current (or radio frequency) sputtering of a conductive Si target in the presence of an oxygen gas, from the viewpoint of productivity. In this case, a small amount of impurities may be incorporated in order to let the target have conductivity. Usually, the silicon oxide film may contain a small amount of impurities (such as Al, B, P and Fe), and an impurity-containing silicon oxide film having a refractive index substantially the same as a silicon oxide film will also be referred to simply as the silicon oxide film.

In the direct current (DC) sputtering of the Si target, arcing is likely to be induced by charge accumulation on an insulating silicon oxide film deposited along the periphery of the eroded region of the target, whereby discharge tends to be unstable, and silicon oxide particles ejected from the arc spot are likely to deposit on the substrate to form defects. To prevent this and to stabilize the film forming, it is also preferred to employ a method of neutralizing the charge by periodically bringing the cathode to a positive voltage.

It is important that the film thickness of the oxide film in the present invention (the first and second inventions) is from 70 to 140 nm from the viewpoint of reduction of the reflectance of oblique incident light and neutralization of the reflection color.

Particularly when it is attempted to increase the antireflection effect to the incident light at an angle of from 40° to 70° from the film face side, the film thickness of the above oxide film is preferably from 80 to 140 nm. Particularly, it is preferably from 95 to 140 nm, more preferably from 105 to 135 nm, furthermore preferably from 115 to 135 nm.

Further, when it is attempted to increase the antireflection effect to the incident light at an angle of at least 5° and less than 40°, the film thickness of the above oxide film is preferably from 70 to 100 nm.

As the transparent nitride film (barrier film) in the first invention and the transparent nitride film (transparent film) in the second invention, preferred is a film having an adequate transparency at the visible light region (for example, the extinction coefficient at a wavelength of 550 nm of at most 0.03, particularly at most 0.01) and having excellent chemical durability. Specific examples of its material include a film consisting essentially of a nitride film of at least one element selected from the group consisting of silicon, aluminum and boron. The refractive index of the film consisting essentially of the above nitride film at the visible light region is approximately from 1.9 to 2.1. In the second invention, said transparent nitride film plays an important role on the appearance of low-reflection performance. Said transparent nitride film may contain a slight amount of oxygen in the film.

The transmittance of visible light (transmittance of visible light incident at right angles) of the glass provided with an antireflection film is preferably from 70 to 85%. If the transmittance of visible light (hereinafter referred to simply as transmittance) exceeds 85%, the antireflection effect tends to be inadequate, and at the same time, the heat resistance tends to be inadequate. If the transmittance is less than 70%, the transmittance of incident light at right angles tends to be too low, and when said glass is applied to a glass for an automobile, the field of view of a drive is less likely to be secured. The transmittance is particularly preferably at least 80%, furthermore preferably at least 82%. Here, in the present invention, the incident light at right angles is the same as the 0° incident light.

In the present invention, the reflectance of incident light at an angle of from 40° to 70° (particularly about 60°) from the film face side on the film face (in the present invention, "reflectance on the film face" does not include the reflection on the non-film face (the face having no film)) is preferably at most 6%. By making it at most 6%, i.e. by lowering by at least about 2% relative to the reflectance (about 8%) on one side of a glass having no coating applied thereto, the reflection of the interior will be suppressed. The lower the reflectance of the incident light at an angle of from 40 to 70° (particularly about 60°) from the film face side on the film face, the better. However, to the incident light at an angle of from 40° to 70° (for example, about 60°), the antireflection conditions to the p-polarization component and the s-polarization component of the incident light are different, and thus it is difficult to make the reflectance of sunlight as random polarization light completely zero. Accordingly, the value of 6% is a practical value.

Further, it is preferred that the reflection color (including the reflection on the non-film face) of the incident light at an angle of from 40° to 70° (particularly about 60°) from the film face side is more neutral than the reflection color (including the reflection on the non-film face) of the incident light at an angle of from 0° to 30° from the film face side. By such a reflection color, the visibility improves when a driver watches an obliquely mounted windshield of an automobile. Particularly, the reflection color tone is neutral similar to a glass having no coating applied thereto, and it can be achieved by preliminarily optimizing the reflectance and the reflection color tone to the 60° incident light.

When a standard source C according to JIS-Z8722 is used as a light source for colorimetry and the color tone of a substance is represented by x and y coordinates, the reflection color to the 60° incident light and the reflection color to the 30° incident light are preferably such that $0.2901 \leq x \leq 0.3301$ and $0.2962 \leq y \leq 0.3362$, particularly preferably $x \leq 0.3201$, from the viewpoint of making the color close to neutral.

Here, for a window glass for an automobile, yellowish or reddish reflection color (particularly reddish reflection color) is not preferred. If both values of x and y are high, the color tends to be deep yellow, and if the value of x is high, the color tends to be deep red.

The method for forming the light absorbing film, the transparent nitride film and the oxide film of the present invention is not particularly limited, but a sputtering method, particularly a DC sputtering method is preferred. By using the DC sputtering method, the process can be stably carried out, and it is thereby easy to form a film of a large area.

As the substrate in the present invention, a glass or a transparent plastic may be used. Particularly, it is preferred to apply the present invention by using, as a substrate, a glass to be used for a windshield of an automobile at the car interior side, since the effect of the present invention will adequately be obtained. As the glass, a transparent float glass (a glass produced by float process) or a colored heat absorbing glass may, for example, be mentioned. Particularly when the present invention is applied to a glass for an automobile, it is preferred to use a heat absorbing glass as a glass substrate from the viewpoint of reducing the energy of direct solar radiation.

The present invention further provides a glass provided with an antireflection film for a window of a transport, comprising a glass substrate and the above antireflection film formed on the glass substrate; and a glass for an automobile using said glass provided with an antireflection film for a window of a transport. As the glass substrate, various types including an uncolored float glass, a colored float glass, a tempered glass and a laminated glass may be used.

The present invention further provides a laminated glass provided with an antireflection film for a window of a transport, wherein the glass provided with an antireflection film comprising a glass substrate and the above antireflection film formed on the substrate, is processed to have a predetermined three-dimensional curved shape by heat treatment, and bonded to another glass substrate by means of an intermediate film so that the antireflection film faces the interior; and its production process. As the above heat treatment, heat treatment in the bending step or heat treatment in the tempering step may be mentioned, and it will be carried out, for example, at a temperature of from 560 to 700° C. in the air atmosphere.

The laminated glass provided with an antireflection film for a window of a transport of the present invention is suitable for a laminated glass for an automobile (particularly for a laminated glass for a windshield of an automobile).

In the laminated glass provided with an antireflection film for a window of a transport of the present invention (hereinafter referred to as laminated glass of the present invention), the reflectance (including reflection on the non-film face) of incident light at an angle of 60° from the film face side is preferably at most 11% (particularly preferably at most 10%).

With respect to the laminated glass for an automobile, the reflectance of incident light at an angle of 60° from the film face side is preferably at most 11%, whereas it is about 14% in the case where a colored glass having no coating applied thereto is used (it is about 16% in the case where an uncolored glass is used). Namely, by lowering by at least about 3% (5% in the case of using an uncolored glass) (i.e. by suppressing to be about 80% or lower based on the absolute value of the reflectance of the glass having no coating applied thereto), reflection of the interior will be suppressed. The lower the reflectance of the incident light at an angle of 60° from the film face side, the better. However, as mentioned above, it is difficult to make the reflectance of the solar radiation light as random polarized light completely zero. Accordingly, the value of 11% is practical.

Further, when the laminated glass of the present invention is applied to a laminated glass for an automobile, the transmittance of incident light at right angles from the film face side is preferably at least 70% (particularly preferably at least 75%). With respect to the windshield of an automobile, the transmittance is defined to be at least 70% in Japan and at least 75% in Europe, in order to secure the visibility of the driver.

Further, with respect to the laminated glass of the present invention, the reflectance of incident light at an angle of 60° from the non-film face side is preferably at least 10% from the viewpoint of heat insulating properties. By making it at least 10%, the solar radiation heat from the exterior (car exterior) can be prevented by reflection, and the increase in the temperature in the interior (car interior) can be reduced. Further, it is preferred to employ a windshield having a relatively high reflectance, from the viewpoint of the design of the car in appearance (high grade impression can be obtained). Further, the interior is less likely to be looked in from the exterior (car exterior), whereby the privacy in the car can be protected.

Further, in the laminated glass of the present invention, the transmittance of solar radiation to the incident light at right angles from the non-film face side is preferably at most 60%, whereby influx of solar energy into the interior (car interior) can be prevented, and the passengers can comfortably ride in the car. It is particularly preferably at most 55%.

With the laminated glass of the present invention, it is possible to realize still lower reflection by using the glass provided with an antireflection film of the present invention for the interior-side glass and by using an AR coated glass also for the exterior—(car exterior)—side glass. In such a case, severe abrasion resistance will be required for the AR coating on the exterior side.

Further, two glass substrates are used for the laminated glass for an automobile, and the glass substrate on which the antireflection film is formed and/or the other glass substrate is preferably a heat absorbing glass, whereby a low reflection on the interior face can be attained, and at the same time, influx of heat can be suppressed.

Particularly, in the case where the laminated glass of the present invention is used as a laminated glass for a windshield of an automobile, and a heat absorbing glass is used as the glass substrate, the transmittance of solar radiation will be decreased, and the environment in the car will be improved, and at the same time, reflection of the dashboard and its surrounding in the car will be reduced for the driver, the front visibility will be improved, and the interior will be designed more freely.

The glass provided with an antireflection film for a window of a transport of the present invention is suitable particularly for a window glass for a vehicle. Particularly, it is suitable for a window glass for an automobile (a windshield, a rear glass and a side glass).

EXAMPLE 1

In a vacuum chamber, metal titanium (Ti) and n-type Si (phosphorus-doped single crystal) having a resistivity of 1.2 Ω·cm were set as targets on a cathode, and the vacuum chamber was evacuated to $1.3 \times 10^{-3}$ Pa ($1 \times 10^{-5}$ Torr). On an uncolored soda-lime glass substrate 1 (thickness: 2 mm) set in the vacuum chamber, an antireflection film of the first invention was formed on the glass substrate as follows.

(1) Firstly, as a discharge gas, a gas mixture of argon and nitrogen (nitrogen: 10%) was introduced, and conductance was adjusted so that the pressure became 0.27 Pa ($2 \times 10^{-3}$ Torr). Then, a negative DC voltage was applied to the cathode of Ti to carry out DC sputtering of the Ti target, and a titanium nitride film 2 (light absorbing film: extinction coefficient of at least 0.5 at the visible light region, extinction coefficient of 1.26 and refractive index of 1.9 at a wavelength of 550 nm) of 7.2 nm was formed.

(2) Introduction of the gas was stopped, and the interior of the vacuum chamber was brought to a high level of vacuum. Then, a gas mixture of argon and nitrogen (nitrogen: 33%) was introduced as a discharge gas, and conductance was adjusted so that the pressure became 0.27 Pa ($2 \times 10^{-3}$ Torr). Then, a DC voltage pulsed through SPARCLE-V (manufactured by ADVANCED ENERGY) from a DC power source was applied to the cathode of Si, to carry out intermittent DC sputtering of the Si target, and a transparent silicon nitride film 3 (transparent nitride film, corresponding to the barrier film in the present example: extinction coefficient of 0.01 and refractive index of 1.93 at a wavelength of 550 nm) of 5 nm was formed.

(3) Introduction of the gas was stopped, and the interior of the vacuum chamber was brought to a high level of vacuum. Then, oxygen gas (100%) was introduced as a discharge gas, and conductance was adjusted so that the pressure became 0.27 Pa ($2 \times 10^{-3}$ Torr). Then, a DC voltage pulsed through SPARCLE-V (manufactured by ADVANCED ENERGY) from a DC power source was applied to the cathode of Si, to carry out intermittent DC sputtering of the Si target, and a silicon oxide film 4 (oxide film, refractive index of about 1.47 at a wavelength of 550 nm) of 122 nm was formed.

With respect to the obtained glass provided with an antireflection film, the following optical properties 1) to 6) were measured based on JIS-R3106. Namely, 1) transmittance of incident light at an angle of incidence of 0° (0° $T_v$), 2) reflectance (including reflection on the exterior side (non-film face side)) of incident light at an angle of incidence of 15° from the interior side (film face side) (→15° interior $R_v$), 3) reflectance (including reflection on the interior side (film face side) of incident light at an angle of incidence of 15° from the exterior side (non-film face side) (→15° exterior $R_v$), 4) reflectance (including reflection on the exterior side) of incident light at an angle of incidence of 60° from the interior side (→60° interior $R_v$), 5) reflectance on the film face (excluding reflection on the exterior side) of incident light at an angle of incidence of 60° from the interior side (→60° film face $R_v$), and 6) transmittance of solar radiation of incident light at right angles from the exterior side (→solar radiation transmittance), were measured. The results are shown in Table 1.

Further, the reflection color was represented by xy coordinates, in accordance with reflection color evaluation using standard source C in JIS-Z8722 as a light source for colorimetry. The results are shown in Table 1.

Further, the obtained glass provided with an antireflection film was cut into a square, soldering was carried out linearly on the edges of two sides facing each other by an ultrasonic soldering iron (SUMBONDER SUMII manufactured by Asahi Glass Company, Limited), and the resistance between the solders on the two sides was measured to obtain the surface resistance. The results are shown in Table 1.

Figure 2:
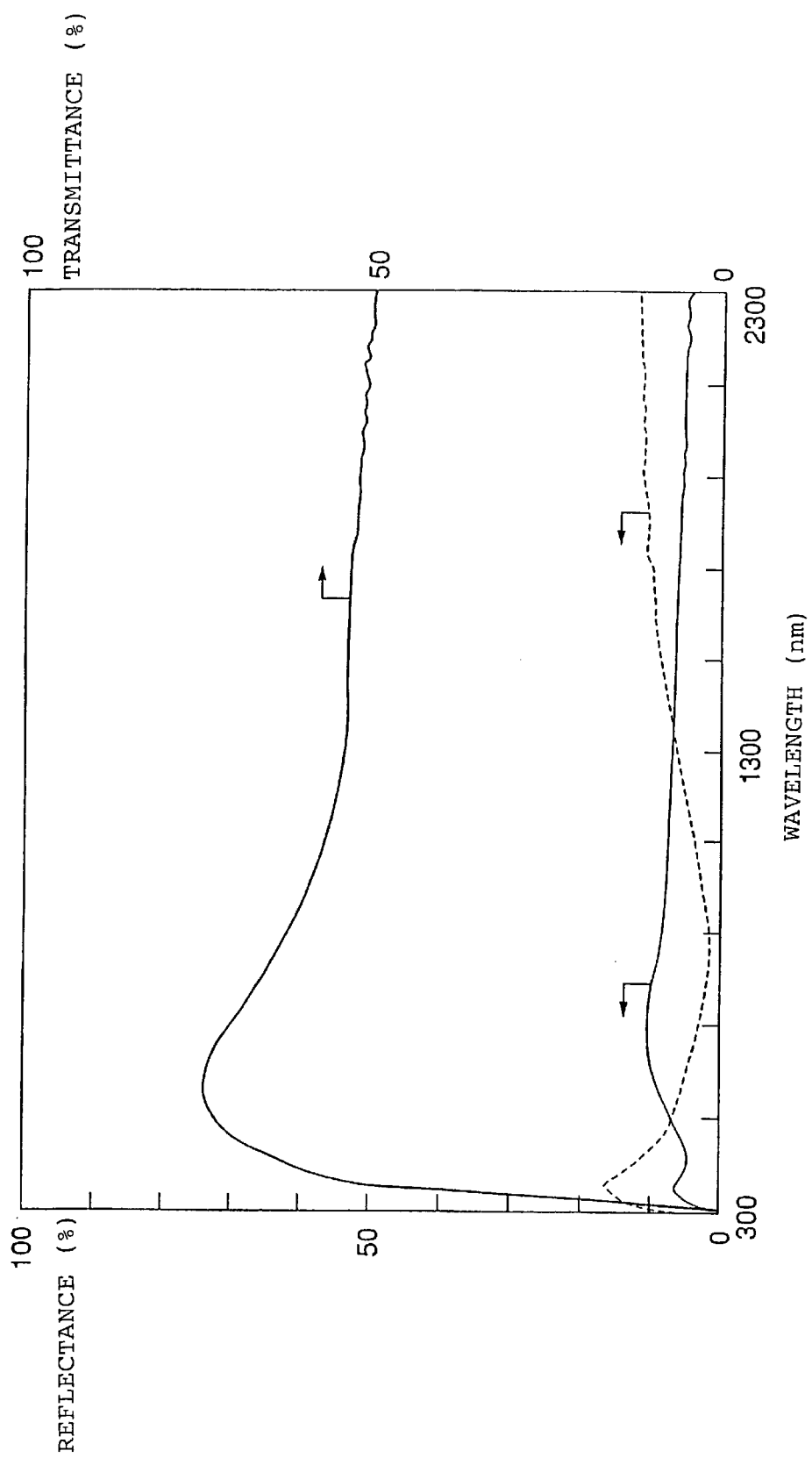
FIG. 2 is a graph showing the optical properties of Example 1.

A schematic sectional view illustrating the obtained glass provided with an antireflection film is shown in FIG. 1. Further, in FIG. 2 are shown three spectral curves of a spectral transmittance curve of the glass provided with an antireflection film at an angle of incidence of 60°, a spectral reflectance curve (dotted line) of the glass provided with an antireflection film at an angle of incidence of 60° on the film face side and a spectral reflectance curve (solid line) of the glass provided with an antireflection film at an angle of incidence of 60° on the glass face side.

Further, the constitution of the glass provided with an antireflection film of Example 1 is shown in Table 2. Each of the constitutions in the following Examples is also shown in Table 2. In Table 2, "TiN" represents the titanium nitride film, "SiN" the transparent silicon nitride film, and "SiO$_2$" the silicon oxide film, and "clear" represents an uncolored soda-lime glass substrate, "green" a heat absorbing glass (SUNGREEN manufactured by Asahi Glass Company, Limited) and "highly absorbing green" a highly heat absorbing glass (UV GREEN manufactured by Asahi Glass Company, Limited). Values in brackets represent the thickness.

EXAMPLE 2

Film forming was carried out in a same manner as in Example 1 except that the film thicknesses of the light absorbing film and the transparent nitride film in Example 1 were changed, to form an antireflection film of the second invention on the glass substrate 1. Namely, in the present Example, a titanium nitride film 2 (light absorbing film) of 5 nm, a transparent silicon nitride film 5 (transparent nitride film) of 62.5 nm and a silicon oxide film 4 (oxide film) of 122 nm were formed in this order.

Figure 3:
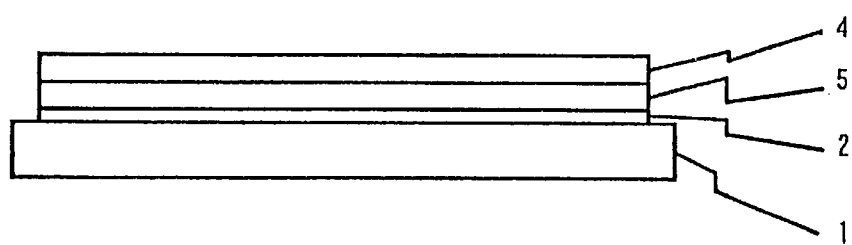
FIG. 3 is a schematic sectional view illustrating the glass provided with an antireflection film for a window of a transport of Example 2.
Figure 4:
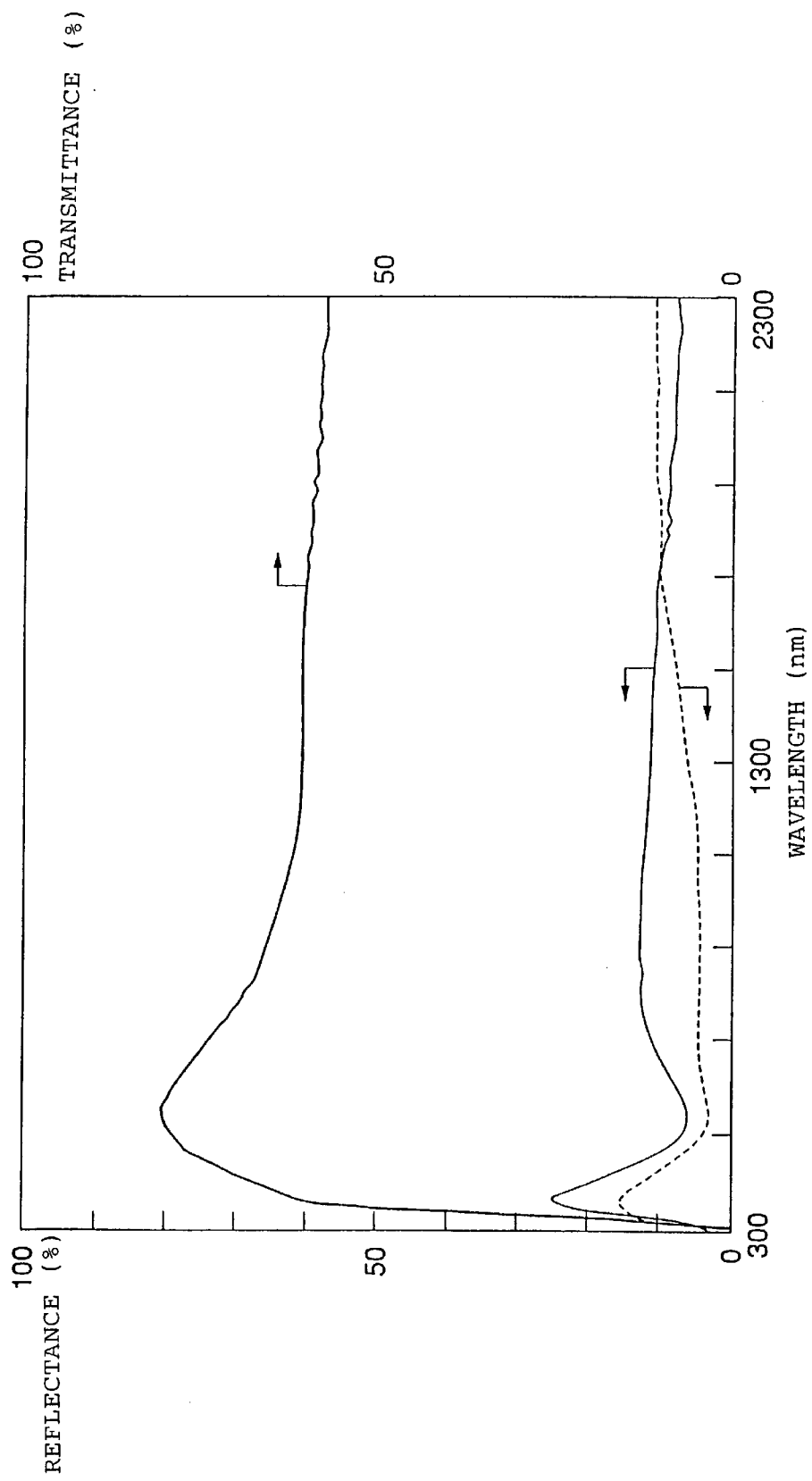
FIG. 4 is a glass showing the optical properties of Example 2.

The obtained glass provided with an antireflection film was evaluated in the same manner as in Example 1. The results are shown in Table 1. A schematic sectional view illustrating the obtained glass provided with an antireflection film is shown in FIG. 3. Further, three spectral curves are shown in FIG. 4 in the same manner as in Example 1.

EXAMPLE 3

The glass provided with an antireflection film obtained in Example 1 was subjected to bending as follows. Namely, the glass provided with an antireflection film obtained in Example 1, and a heat absorbing glass 7 (green glass "SUNGREEN" manufactured by Asahi Glass Company, Limited, having a thickness of 2 mm and washed with pure water) having the same size as said glass, were prepared. The two glasses were overlaid so that the glass provided with an antireflection film was on the upper side and the other glass was on the lower side, and the antireflection film face faced upward. Between the two glasses, a powder for preventing heat seal was spread.

The two glasses were put on a mold for forming, and heat treatment was carried out in an electric heating furnace for bending. The heat treatment was carried out in the air atmosphere under such conditions that the preheating time was 3 minutes, the maximum temperature holding time was 5 minutes, the maximum achievable temperature of the glass was 620° C. and the slow cooling time was 3 minutes.

Figure 5:
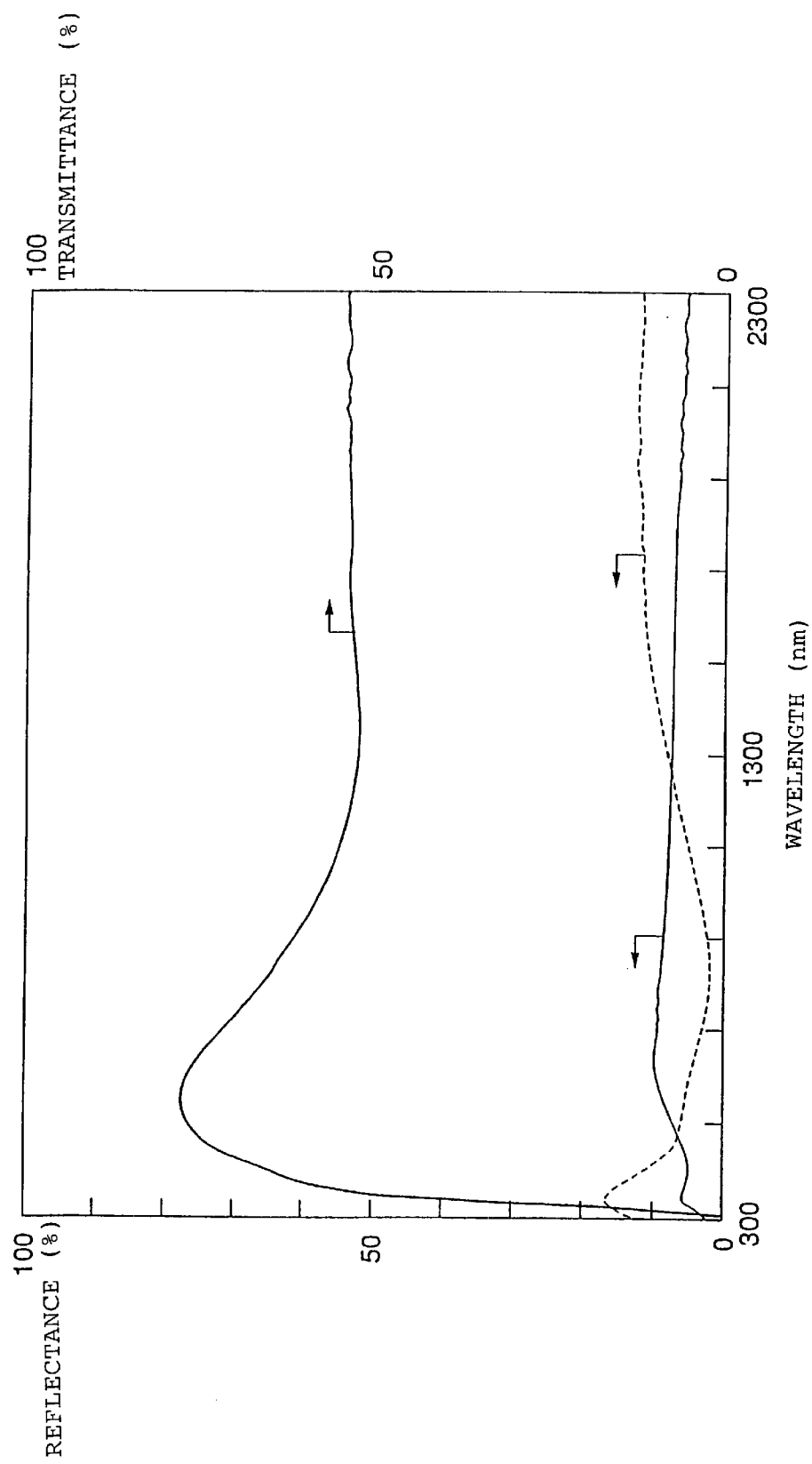
FIG. 5 is a graph showing the optical properties after heat treatment in Example 3.

No wrinkle or change in color was shown on the antireflection film, and no extraordinary warp of the glass plate was shown. The two glasses were fitted in the mold well, and subjected to bending. The glass provided with an antireflection film after the heat treatment was evaluated. The results are shown in Table 1. Blank columns in Table 1 represent that no measurement was carried out. Further, three spectral curves are shown in FIG. 5 in the same manner as in Example 1.

Figure 6:
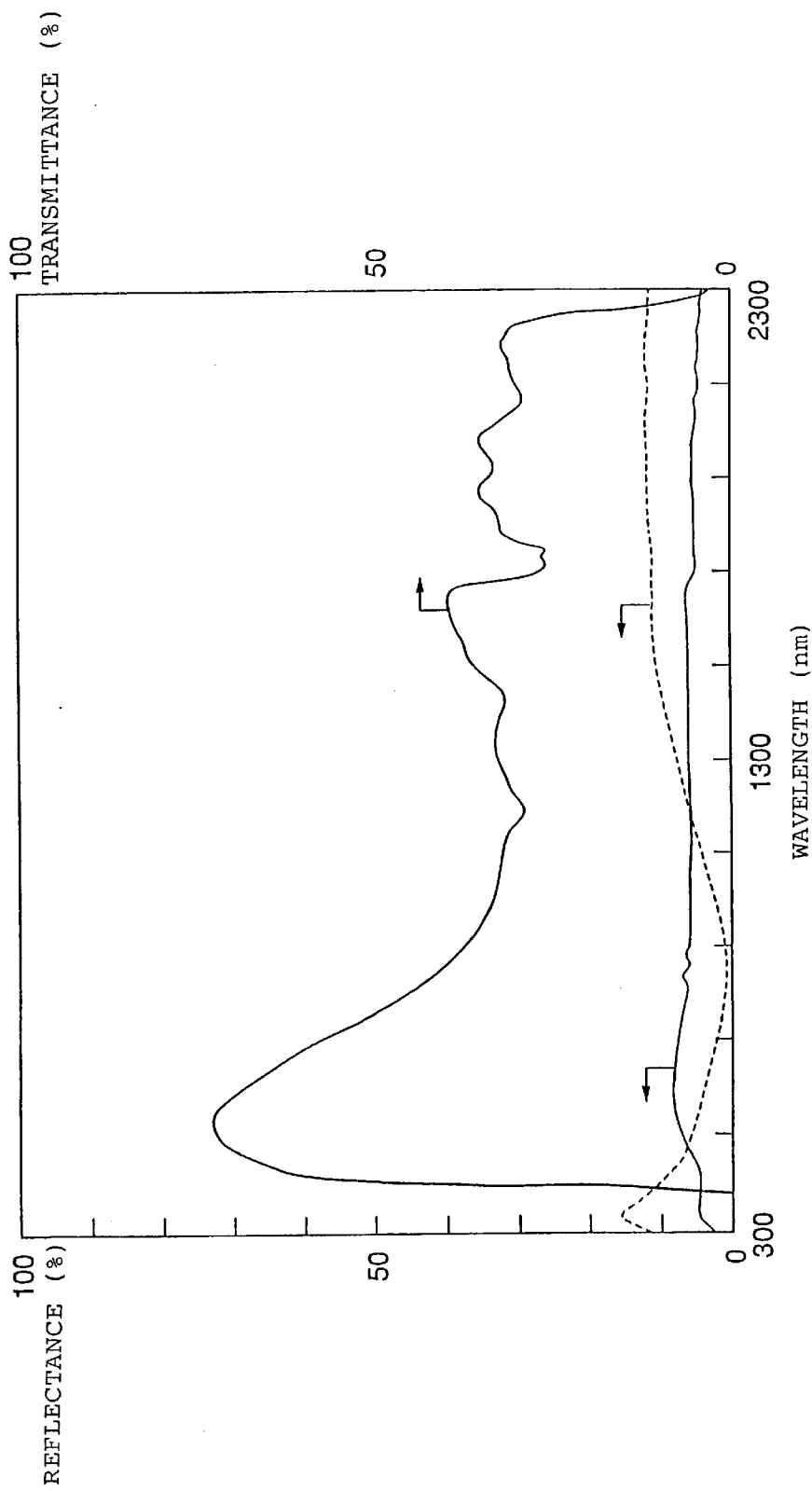
FIG. 6 is a graph showing the optical properties after glass lamination in Example 3.
Figure 7:
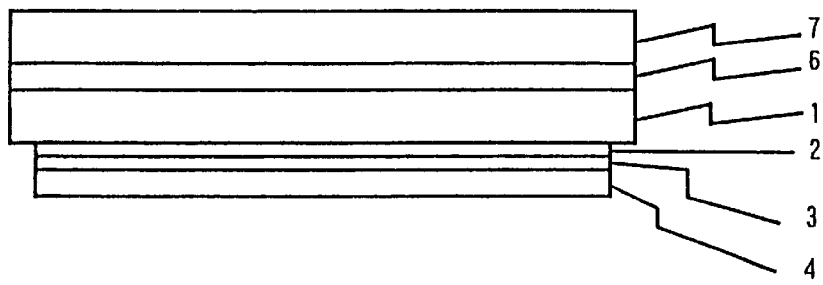
FIG. 7 is a schematic sectional view illustrating the state after glass lamination in Example 3.

Then, the two glasses subjected to bending were laminated by means of an intermediate film (polyvinyl butyral) having a thickness of 0.76 mm, to form a laminated glass. A schematic sectional view illustrating the obtained laminated glass is shown in FIG. 7. The obtained laminated glass was evaluated in the same manner as in Example 1. The results are shown in Table 1. In Table 1, said results are shown in the column "Ex. 3 after lamination" (the same applies hereinafter). Further, three spectral curves are shown in FIG. 6 in the same manner as in Example 1.

EXAMPLE 4

Figure 8:
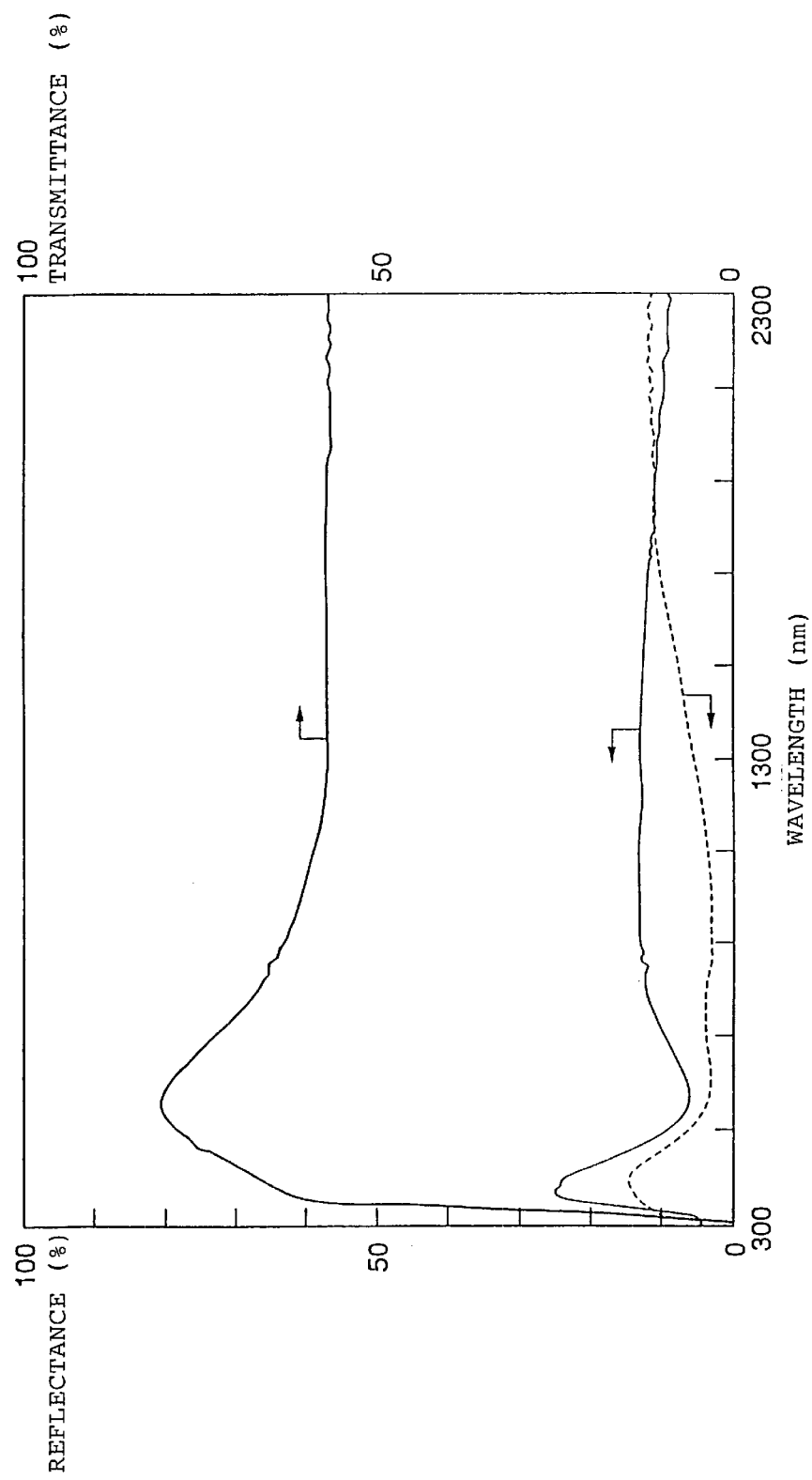
FIG. 8 is a graph showing the optical properties after heat treatment in Example 4.

Bending was carried out in the same manner as in Example 3 except that "the glass provided with an antireflection film obtained in Example 2" was used instead of "the glass provided with an antireflection film obtained in Example 1" in Example 3, and the glass provided with an antireflection film after the heat treatment was evaluated. The results are shown in Table 1. Three spectral curves are shown in FIG. 8 in the same manner as in Example 1.

Figure 9:
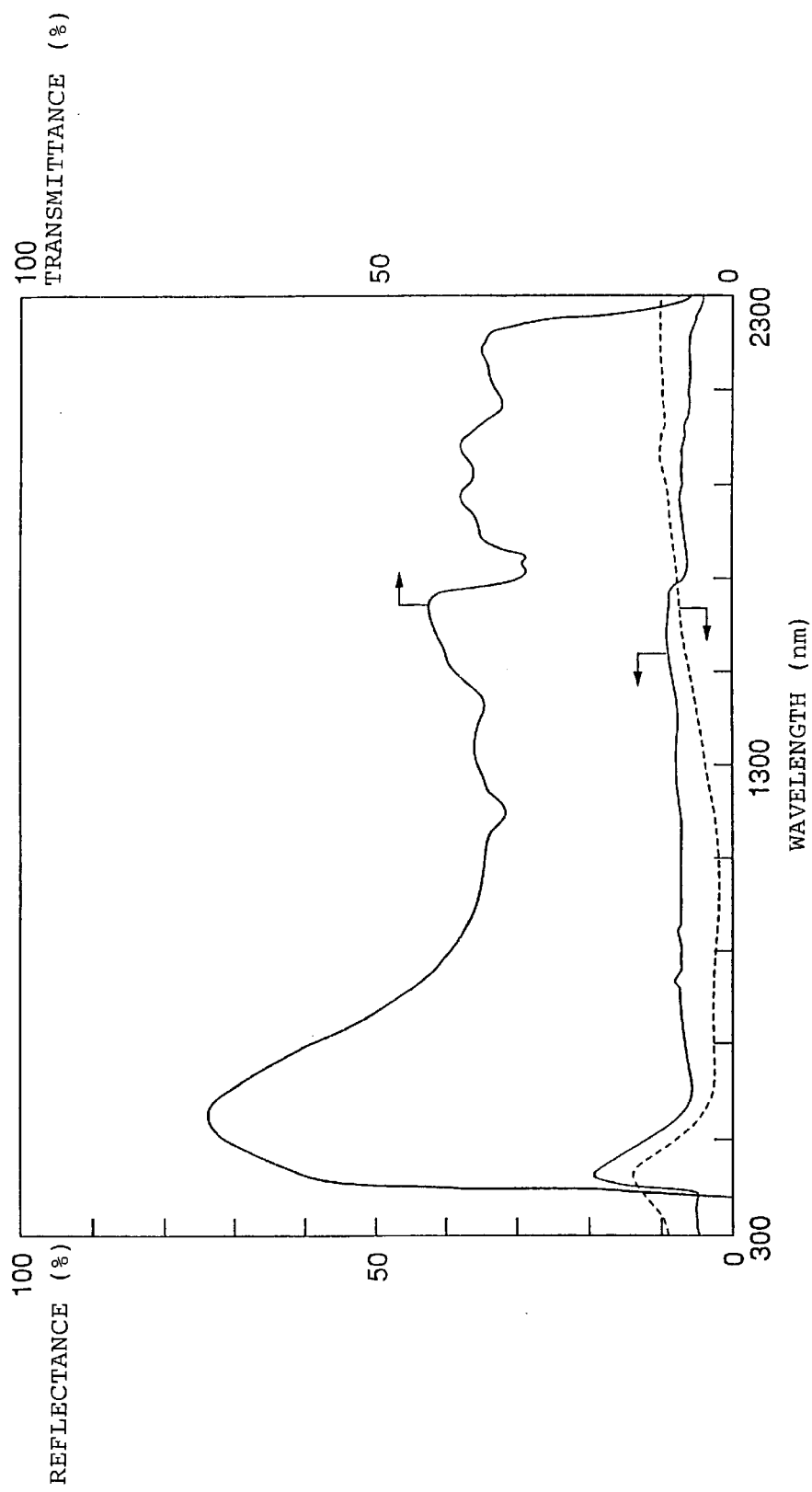
FIG. 9 is a graph showing the optical properties after glass lamination in Example 4.
Figure 10:
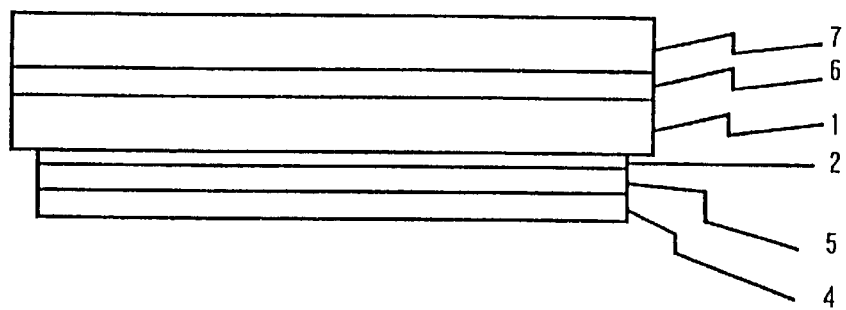
FIG. 10 is a schematic sectional view illustrating the state after glass lamination in Example 4.

Then, a laminated glass was formed in the same manner as in Example 3, and evaluation was carried out in the same manner as in Example 1. The results are shown in Table 1. A schematic sectional view illustrating the obtained laminated glass is shown in FIG. 10. Further, three spectral curves are shown in FIG. 9 in the same manner as in Example 1.

EXAMPLE 5

Film forming was carried out in the same manner as in Example 1 except that the film thicknesses of the light absorbing film and the transparent oxide film in Example 1 were changed, and no transparent nitride film in Example 1 (barrier film in Example 1) was formed, to form an antireflection film of the first invention on a glass substrate. Namely, in the present Example, a titanium nitride film (light absorbing film) of 4 nm and a silicon oxide film (oxide film) of 115 nm were formed in this order.

The obtained glass provided with an antireflection film was evaluated in the same manner as in Example 1. The results are shown in Table 1.

EXAMPLE 6

Bending was carried out in the same manner as in Example 3 except that "the glass provided with an antireflection film obtained in Example 5" was used instead of "the glass provided with an antireflection film obtained in Example 1" in Example 3, and then a laminated glass was formed in the same manner as in Example 3. The optical properties were measured in the same manner as in Example 1, and the results are shown in Table 1.

Then, a laminated glass was formed in the same manner as in Example 3, and evaluated in the same manner as in Example 1. The results are shown in Table 1.

EXAMPLE 7

Film forming was carried out on a glass substrate in the same manner as in Example 1 except that the film thicknesses of the light absorbing film and the oxide film in Example 1 were changed. Namely, in the present Example, a titanium nitride film (light absorbing film) of 10 nm, a transparent silicon nitride film (transparent nitride film) of 5 nm and a silicon oxide film (oxide film) of 85 nm were formed in this order.

With respect to the obtained glass provided with an antireflection film, the optical properties were measured in the same manner as in Example 1. The results are shown in Table 1.

EXAMPLE 8

Bending was carried out in the same manner as in Example 3 except that "the glass provided with an antireflection film obtained in Example 7" was used instead of "the glass provided with an antireflection film obtained in Example 1" in Example 3, and an uncolored soda-lime glass (thickness: 2 mm) having a thickness of 2 mm was used instead of "the heat absorbing glass" in Example 3. With respect to the glass provided with an antireflection film after the heat treatment, the optical properties were measured. The results are shown in Table 1.

Then, a laminated glass was obtained in the same manner as in Example 3. The obtained laminated glass was evaluated in the same manner as in Example 1, and the results are shown in Table 1.

EXAMPLE 9

Film forming was carried out in the same manner as in Example 1 except that the film thicknesses in Example 1 were changed, to form an antireflection film of the first invention on a glass substrate 1. Namely, in the present Example, a titanium nitride film (light absorbing film) of 4 nm, a transparent silicon nitride film (barrier film) of 5 nm and a silicon oxide film (oxide film) of 90 nm were formed in this order.

The obtained glass provided with an antireflection film was evaluated in the same manner as in Example 1 except that the optical properties with respect to "the incident light at an angle of incidence of 30°" were evaluated instead of the optical properties with respect to "the incident light at an angle of incidence of 60°" in Example 1, and the results are shown in Table 1.

EXAMPLE 10

Bending was carried out in the same manner as in Example 3 on the glass provided with an antireflection film obtained in Example 9, except that "the glass provided with an antireflection film obtained in Example 9" was used instead of "the glass provided with an antireflection film obtained in Example 1" in Example 3, and "a highly heat absorbing glass (UV COOLGREEN manufactured by Asahi Glass Company, Limited) having a thickness of 2 mm" was used instead of "the heat absorbing glass" in Example 3. Then, the glass provided with an antireflection film after the heat treatment was evaluated in the same manner as in Example 9. The results are shown in Table 1.

Then, a laminated glass was obtained in the same manner as in Example 3. The obtained laminated glass was evaluated in the same manner as in Example 9. The results are shown in Table 1.

Comparative Example 1

Film forming was carried out on a glass substrate in the same manner as in Example 1 except that the film thicknesses of the light absorbing film and the oxide film in Example 1 were changed. Namely, in the present Example, a titanium nitride film (light absorbing film) of 13 nm, a transparent silicon nitride film (transparent nitride film) of 5 nm and a silicon oxide film (oxide film) of 85 nm were formed in this order.

With respect to the obtained glass provided with an antireflection film, the optical properties were measured in the same manner as in Example 1. The results are shown in Table 1.

Comparative Example 2

Bending was carried out in the same manner as in Example 3 except that "the glass provided with an antireflection film obtained in Comparative Example 1" was used instead of "the glass provided with an antireflection film obtained in Example 1" in Example 3, and an uncolored soda-lime glass (thickness: 2 mm) having a thickness of 2 mm was used instead of "the heat absorbing glass" in Example 3. With respect to the glass provided with an antireflection film after the heat treatment, the optical properties were measured. The results are shown in Table 1.

Then, a laminated glass was obtained in the same manner as in Example 3. The obtained laminated glass was evaluated in the same manner as in Example 1. The results are shown in Table 1.

Comparative Example 3

Two sheets of heat absorbing glass (two sheets of green glass having a thickness of 2 mm and washed with pure water, i.e. "SUNGREEN" and "UV COOLGREEN" manufactured by Asahi Glass Company, Limited, respectively) were laminated by means of an intermediate film (polyvinyl butyral) interposed therebetween, to form a laminated glass. With respect to the obtained laminated glass, the optical properties were measured in the same manner as in Example 1. The results are shown in Table 1.

Comparative Example 4

Two sheets of heat absorbing glass (two sheets of green glass having a thickness of 2 mm and washed with pure water, i.e. two sheets of "SUNGREEN" manufactured by Asahi Glass Company, Limited) were laminated by means of an intermediate film (polyvinyl butyral) having a thickness of 0.76 mm, to form a laminated glass. With respect to the obtained laminated glass, the optical properties were measured in the same manner as in Example 1. The results are shown in Table 1.

Comparative Example 5

With respect to the laminated glass obtained in Comparative Example 3, the optical properties with respect to "the incident light at an angle of incidence of 30°" were evaluated instead of the optical properties with respect to "the incident light at an angle of incidence of 60°" in Comparative Example 3, and the results are shown in Table 1 as Comparative Example 5.

From Table 1, it is found that the antireflection films obtained in Examples 1 to 10, are excellent in heat resistance, have low reflectances 60° of the incident light (60° interior $R_y$ and 60° film face $R_y$), and provide more neutral reflection color tone, although they have a simple film constitution.

With respect to the antireflection films obtained in Comparative Examples 1 and 2, the value of x to the incident light at an angle of 60° is high, and the reflection color tends to be red, which is not a preferred color tone.

The antireflection films obtained in Comparative Examples 1 and 2, have a transmittance of visible light of less than 70%, and they are not suitable for a windshield of an automobile.

Further, the laminated glasses obtained in Examples 3, 4, 6, 8 and 10, have a low reflectance on the film face side (i.e. interior side), as compared with the laminated glasses (Comparative Examples 3, 4 and 5) using a heat absorbing glass having no film formed thereon.

Further, in the glass provided with an antireflection film having a barrier film of Example 1, the change in transmittance before and after the heat treatment is small.

Further, the antireflection films obtained in Examples 9 and 10, are excellent in heat resistance, and have low reflectances of 30° incident light (30° interior $R_v$ and 30° film face $R_v$), although they have a simple film constitution. The values of 30° interior $R_v$ and 30° film face $R_v$ are extremely low as compared with the laminated glass using a heat absorbing glass having no film formed thereon (Comparative Example 5). Further, the transmittance of solar radiation also shows a low value of at most 50%.

The reflection color (including reflection on the non-film face side) by the incident light at an angle of 15° from the film face side and the reflection color (including reflection on the non-film face side) by the incident light at an angle of 60° from the film face side were compared with each other with respect to Examples 3, 4 and 6 wherein the glass lamination was carried out, whereupon the reflection color by the incident light at an angle of 60° from the film face side became more neutral.

Further, abrasion resistance was checked with respect to the antireflection film face in each of Examples 1 to 10. Namely, abrasion test was carried out by a Taber abrader at a load of 2.45N at 500 revolutions in accordance with JIS-R3212. No peeling of the film was shown after the abrasion test, the haze value was at most 3% in all cases, and practically adequate abrasion resistance was confirmed.

Further, with respect to the antireflection films obtained in Examples 1 to 10, chemical durability was evaluated. Namely, the 0° $T_v$ and the 60° film face $R_v$ were measured before and after impregnation in 0.1 mol/l of aqueous sodium hydroxide solution at room temperature for 2 hours, and as a result, the values were not changed, whereby an excellent alkali resistance was confirmed. Further, the 0° $T_v$ and the 60° film face $R_v$ were measured before and after impregnation in 0.05 mol/l of aqueous sulfuric acid solution at room temperature for 2 hours, and as a result, the values were not changed, whereby an excellent acid resistance was confirmed.

A windshield for an automobile was formed by using a glass substrate for an automobile as the glass substrate, by forming an antireflection film in the same manner as in Example 1, and by carrying out glass lamination in the same manner as in Example 3. The optical properties were measured in the same manner as in Example 1, and excellent optical properties were obtained.

TABLE 1

| | 0° $T_v$ % | 15° Interior $R_v$ % | 15° Exterior $R_v$ % | 15° Interior x | 15° Interior y | 60° Interior $R_v$ % | 60° Exterior $R_v$ % | 60° Film face $R_v$ % | 60° Interior x | 60° Interior y | Solar radiation transmittance % | Film resistance KΩ/□ |
|---|---|---|---|---|---|---|---|---|---|---|---|---|
| Ex. 1 | 74.4 | 5.5 | 8.7 | | | 10.3 | 16.5 | 5.1 | | | 65.1 | 0.8 |
| Ex. 2 | 76.2 | 5.4 | 9.8 | | | 9.2 | 14.6 | 3.7 | | | 68.5 | 1.0 |
| Ex. 3 | 76.6 | 4.7 | 8.7 | | | 10.4 | 16.2 | 5.2 | | | 66.7 | 1.6 |
| Ex. 3 after lamination | 70.2 | 4.5 | 7.8 | 0.2693 | 0.2918 | 9.5 | 15.6 | 5.2 | 0.3065 | 0.3332 | 49.8 | 1.6 |
| Ex. 4 | 79.4 | 3.7 | 6.7 | | | 9.5 | 14.2 | 3.6 | | | 70.2 | 2.0 |
| Ex. 4 after lamiation | 71.6 | 3.7 | 7.2 | 0.2169 | 0.2083 | 8.5 | 10.8 | 3.6 | 0.3114 | 0.3072 | 51.1 | 2.0 |
| Ex. 5 | 78.1 | 5.2 | 9.0 | | | 10.5 | 15.3 | 5.4 | | | 70.2 | 1.1 |
| Ex. 6 | 81.3 | 5.5 | 8.5 | | | 10.8 | 15.0 | 5.8 | | | 74.0 | 2.2 |
| Ex. 6 after lamnation | 75.0 | 5.1 | 8.0 | 0.2781 | 0.3050 | 9.8 | 14.0 | 5.8 | 0.3038 | 0.3303 | 53.9 | 2.2 |
| Ex. 7 | 71.5 | 4.0 | 10.3 | | | 9.5 | 15.8 | 5.5 | | | 60.1 | 0.4 |
| Ex. 8 | 73.5 | 3.2 | 10.0 | | | 9.9 | 15.6 | 5.7 | | | 62.5 | 0.8 |
| Ex. 8 after lamination | 71.4 | 3.2 | 9.8 | 0.2974 | 0.3197 | 9.8 | 15.3 | 5.7 | 0.3192 | 0.3393 | 59.3 | 0.8 |
| Comp. Ex. 1 | 64.8 | 2.2 | 12.9 | | | 8.3 | 18.8 | 4.9 | | | 53.4 | 0.3 |
| Comp. Ex. 2 | 66.5 | 2.2 | 12.4 | | | 8.6 | 16.6 | 4.9 | | | 55.2 | 0.6 |
| Comp. Ex. 2 after lamination | 65.3 | 2.2 | 12.1 | | | 8.4 | 16.3 | 5.0 | 0.3263 | 0.3426 | 52.4 | 0.6 |
| Comp. Ex. 3 | 75.3 | 6.8 | 6.8 | 0.3044 | 0.3340 | 13.3 | 13.3 | 7.5 | 0.3053 | 0.3342 | 48.1 | |
| Comp. Ex. 4 | 78.5 | 7.0 | 7.0 | 0.3043 | 0.3354 | 13.6 | 13.6 | 9.3 | 0.3062 | 0.3334 | 53.8 | |

| | 0° $T_v$ % | 15° Interior $R_v$ % | 15° Exterior $R_v$ % | 15° Interior x | 15° Interior y | 30° Interior $R_v$ % | 30° Exterior $R_v$ % | 30° Film face $R_v$ % | 30° Interior x | 30° Interior y | Solar radiation transmittance % | Film resistance KΩ/□ |
|---|---|---|---|---|---|---|---|---|---|---|---|---|
| Ex. 9 | 79.4 | 3.9 | 9.0 | | | 4.1 | 9.0 | 0.9 | | | 70.9 | 1.1 |
| Ex. 10 | 82.2 | 4.6 | 8.5 | | | 4.7 | 8.5 | 1.1 | | | 74.6 | 2.2 |
| Ex. 10 after lamination | 71.1 | 3.5 | 8.2 | 0.2827 | 0.3160 | 3.5 | 8.2 | 1.1 | 0.3103 | 0.3406 | 47.1 | 2.2 |
| Comp. Ex. 5 | 75.3 | 6.8 | 6.8 | 0.3044 | 0.3340 | 7.0 | 7.0 | 4.2 | 0.3054 | 0.333 | 48.1 | |

TABLE 2

| | Constitution Substrate/first layer/second layer/third layer | Another substrate laminated by means of an intermediate film |
|---|---|---|
| Ex. 1 | Clear(2 mm)/TiN(7.2 nm)/SiN(5 nm)/SiO2(122 nm) | Nil |
| Ex. 2 | Clear(2 mm)/TiN(5 nm)/SiN(62.5 nm)/SiO2(122 nm) | Nil |
| Ex. 3 | Clear(2 mm)/TiN(7.2 nm)/SiN(5 nm)/SiO2(122 nm) | Nil |
| Ex. 3 after lamination | Clear(2 mm)/TiN(7.2 nm)/SiN(5 nm)/SiO2(122 nm) | Green (2 mm) |
| Ex. 4 | Clear(2 mm)/TiN(5 nm)/SiN(62.5 nm)/SiO2(122 nm) | Nil |
| Ex. 4 after lamination | Clear(2 mm)/TiN(5 nm)/SiN(62.5 nm)/SiO2(122 nm) | Green (2 mm) |
| Ex. 5 | Clear(2 mm)/TiN(4 nm)/ SiO2(115 nm) | Nil |
| Ex. 6 | Clear(2 mm)/TiN(4 nm)/ SiO2(115 nm) | Nil |
| Ex. 6 after lamination | Clear(2 mm)/TiN(4 nm)/ SiO2(115 nm) | Green (2 mm) |
| Ex. 7 | Clear(2 mm)/TiN(10 nm)/SiN(5 nm)/SiO2(85 nm) | Nil |
| Ex. 8 | Clear(2 mm)/TiN(10 nm)/SiN(5 nm)/SiO2(85 nm) | Nil |
| Ex. 8 after lamination | Clear(2 mm)/TiN(10 nm)/SiN(5 nm)/SiO2(85 nm) | Clear (2 mm) |
| Comp. Ex. 1 | Clear(2 mm)/TiN(13 nm)/SiN(5 nm)/SiO2(85 nm) | Nil |
| Comp. Ex. 2 | Clear(2 mm)/TiN(13 nm) /SiN(5 nm) /SiO2 (85 nm) | Nil |
| Comp. Ex. 2 after lamination | Clear(2 mm)/TiN(13 nm)/SiN(5 nm)/SiO2(85 nm) | Clear (2 mm) |
| Comp. Ex. 3 | Highly absorbing green (2 mm) | Green (2 mm) |
| Comp. Ex. 4 | Green (2 mm) | Green (2 mm) |
| Ex. 9 | Clear(2 mm)/TiN(4 nm)/SiN(5 nm)/SiO2 (90 nm) | Nil |
| Ex. 10 | Clear(2 mm)/TiN(4 nm)/SiN(5 nm)/SiO2 (90 nm) | Nil |
| Ex. 10 after lamination | Clear(2 mm)/TiN(4 nm)/SiN(5 nm)/SiO2 (90 nm) | Highly absorbing green (2 mm) |
| Comp. Ex. 5 | Highly absorbing green (2 mm) | Green (2 nm) |

INDUSTRIAL APPLICABILITY

The antireflection film of the present invention has an adequately low reflection performance to the oblique incident light, an adequate abrasion resistance and a high transmittance of visible light.

Accordingly, when the antireflection film of the present invention is used for a windshield for an automobile, reflection of the dashboard and its surrounding in the car will be reduced for the driver, and the front visibility will be improved, and at the same time, the interior will be designed more freely. Further, by employing a specific constitution, the reflection color to the oblique incident light can be made neutral.

Further, the antireflection film of the present invention has a total film thickness of at most half the conventional transparent multi-layer AR film, and thus the production cost will be reduced.

Further, the antireflection film of the present invention has a high transmittance, is suitable for a windshield for an automobile using a heat absorbing glass, and makes it possible to satisfy both heat shielding property and low reflection property.

Further, the antireflection film of the present invention has a thick oxide film, and it is thereby excellent in abrasion resistance. Accordingly, when the antireflection film of the present invention is used for a window of a transport on the interior (car interior) side, a window of a transport (particularly window glass for an automobile) having adequate chemical and mechanical durability will be provided. The above durability is so high that application to a door glass for an automobile is possible.

Further, the antireflection film of the present invention adequately resists heat treatment in production of a glass for an automobile (e.g. heat treatment in bending step or tempering step), and it is thereby possible to carry out after-heat treatment. Accordingly, by using the antireflection film of the present invention, a laminated glass for a window of a transport, particularly a laminated glass for a windshield of an automobile, can be easily produced by steps of film forming on a flat glass substrate, cutting, bending and lamination in this order, at a reduced cost with a high productivity.

What is claimed is:

1. A window of a transport, which comprises a substrate, and a light absorbing film consisting essentially of a nitride and an oxide film having a refractive index of from 1.45 to 1.70 formed on the substrate in this order on the substrate, wherein the geometrical film thickness of the light absorbing film is from 3 to 12 nm, and the geometrical film thickness of the oxide film is from 70 to 140 nm.

2. The window of a transport according to claim 1, wherein a transparent nitride film having a geometrical film thickness of from 1 to 20 nm is formed between the light absorbing film and the oxide film.

3. The window of a transport according to claim 2, wherein the reflectance of visible light incident at an angle of from 40° to 70° from the film face side is at most 6% on the film face.

4. The window of a transport according to claim 2, wherein the substrate is a glass substrate.

5. The window of a transport of claim 4, wherein the transport is an automobile.

6. The laminated glass for a window of a transport, which comprises the glass substrate provided with an antireflection film for a window of a transport of claim 4, heat-treated to have a predetermined three-dimensional curve shape, and having a second glass substrate bonded to said glass substrate by means of an intermediate film so that the antireflection film faces the interior of such transport.

7. The laminated glass provided with an antireflection film for a window of a transport according to claim 4, wherein the reflectance of visible light incident at an angle of 60° from the film face side is at most 11%.

8. A process for producing a laminated glass provided with an antireflection film for a window of a transport, which comprises heat-treating the glass substrate having an antireflection film for a window of a transport of claim 4 to form a predetermined three-dimensional curved shape, and then bonding said heat-treated glass substrate having an antireflection film to another glass substrate by means of an intermediate film so that the antireflection film faces the interior of said transport.

9. The window of a transport of claim 4, wherien the glass substrate is a heat absorbing glass.

10. The window of a transport of claim 9, wherein the transport is an automobile.

11. The laminated glass for a window of a transport, which comprises the glass substrate provided with an antireflection film for a window of a transport of claim 9, heat-treated to have a predetermined three-dimensional curve shape, and having a second glass substrate bonded to said glass substrate by means of an intermediate film so that the antireflection film faces the interior of such transport.

12. The laminated glass provided with an antireflection film for a window of a transport according to claim 9, wherein the reflectance of visible light incident at an angle of 60° from the film face side is at most 11%.

13. A process for producing a laminated glass provided with an antireflection film for a window of a transport, which comprises heat-treating the glass substrate having an antireflection film for a window of a transport of claim 9 to form a predetermined three-dimensional curved shape, and then bonding said heat-treated glass substrate having an antireflection film to another glass substrate by means of an intermediate film so that the antireflection film faces the interior of said transport.

14. The window of a transport according to claim 1, wherein the reflectance of visible light incident at an angle of from 40° to 70° from the film face side is at most 6% on the film face.

15. The window of a transport of claim 14, wherein the substrate is a glass substrate.

16. The window of a transport of claim 15, wherein the transport is an automobile.

17. The laminated glass for a window of a transport, which comprises the glass substrate provided with an antireflection film for a window of a transport of claim 15, heat-treated to have a predetermined three-dimensional curve shape, and having a second glass substrate bonded to said glass substrate by means of an intermediate film so that the antireflection film faces the interior of such transport.

18. The laminated glass provided with an antireflection film for a window of a transport according to claim 15, wherein the reflectance of visible light incident at an angle of 60° from the film face side is at most 11%.

19. A process for producing a laminated glass provided with an antireflection film for a window of a transport, which comprises heat-treating the glass substrate having an antireflection film for a window of a transport of claim 15 to form a predetermined three-dimensional curved shape, and then bonding said heat-treated glass substrate having an antireflection film to another glass substrate by means of an intermediate film so that the antireflection film faces the interior of said transport.

20. The window of a transport of claim 15, wherien the glass substrate is a heat absorbing glass.

21. The window of a transport of claim 20, wherein the transport is an automobile.

22. The laminated glass for a window of a transport, which comprises the glass substrate provided with an antireflection film for a window of a transport of claim 20, heat-treated to have a predetermined three-dimensional curve shape, and having a second glass substrate bonded to said glass substrate by means of an intermediate film so that the antireflection film faces the interior of such transport.

23. The laminated glass provided with an antireflection film for a window of a transport according to claim 20, wherein the reflectance of visible light incident at an angle of 60° from the film face side is at most 11%.

24. A process for producing a laminated glass provided with an antireflection film for a window of a transport, which comprises heat-treating the glass substrate having an antireflection film for a window of a transport of claim 20 to form a predetermined three-dimensional curved shape, and then bonding said heat-treated glass substrate having an antireflection film to another glass substrate by means of an intermediate film so that the antireflection film faces the interior of said transport.

25. The window of a transport of claim 1, wherein the substrate is a glass substrate.

26. The window of a transport of claim 25, wherein the glass substrate is a heat absorbing glass.

27. The window of a transport of claim 26, wherein the transport is an automobile.

28. The laminated glass for a window of a transport, which comprises the glass substrate provided with an antireflection film for a window of a transport of claim 26, heat-treated to have a predetermined three-dimensional curve shape, and having a second glass substrate bonded to said glass substrate by means of an intermediate film so that the antireflection film faces the interior of such transport.

29. A process for producing a laminated glass provided with an antireflection film for a window of a transport, which comprises heat-treating the glass substrate having an antireflection film for a window of a transport of claim 26 to form a predetermined three-dimensional curved shape, and then bonding said heat-treated glass substrate having an antireflection film to another glass substrate by means of an intermediate film so that the antireflection film faces the interior of said transport.

30. The window of a transport of claim 25, wherein the transport is an automobile.

31. The laminated glass provided with an antireflection film for a window of a transport according to claim 30, wherein the reflectance of visible light incident at an angle of 60° from the film face side is at most 11%.

32. A laminated glass for a window of a transport, which comprises the glass substrate provided with an antireflection film for a window of a transport of claim 25, heat treated to have a predetermined three-dimensional curve shape, and having a second glass substrate bonded to said glass substrate by means of an intermediate film so that the antireflection film faces the interior of said transport.

33. A process for producing a laminated glass provided with an antireflection film for a window of a transport, which comprises heat treating the glass substrate having an antireflection film for a window of a transport of claim 25 to form a predetermined three-dimensional curved shape, and then bonding said heat treated glass substrate having an antireflection film to another glass substrate by means of an intermediate film so that the antireflection film faces the interior of said transport.

34. An antireflection film on a window of a transport, which comprises a light absorbing film consisting essentially of a nitride, a transparent film having a refractive index of from 1.90 to 2.40, and an oxide film having a refractive index of from 1.45 to 1.70, formed on a substrate in this order on the substrate, wherein the geometrical film thickness of the light absorbing film is from 3 to 12 nm, the geometrical film thickness of the transparent film having a refractive index of from 1.90 to 2.40 is from 40 to 80 nm, and the geometrical film thickness of the oxide film is from 70 to 140 nm.

35. An antireflection film on a window of a transport according to claim 34, wherein the reflectance of visible light at an angle of from 40° to 70° from the film face side is at most 6% on the film face.

36. The antireflection film on a window of a transport according to claim 34, wherein the substrate is a glass substrate.

37. The antireflection film on a window of a transport of claim 36, wherein the glass substrate is a heat absorbing glass.

38. The antireflection film on a window of a transport of claim 37, wherein the transport is an automobile.

39. The laminated glass for a window of a transport, which comprises the glass substrate provided with an antireflection film on a window of a transport of claim 37, heat-treated to have a predetermined three-dimensional curve shape, and having a second glass substrate bonded to said glass substrate by means of an intermediate film so that the antireflection film faces the interior of such transport.

40. The laminated glass provided with an antireflection film on a window of a transport according to claim 37, wherein the reflectance of visible light incident at an angle of 60° from the film face side is at most 11%.

41. A process for producing a laminated glass provided with an antireflection film for a window of a transport, which comprises heat-treating the glass substrate having an antireflection film on a window of a transport of claim 37 to form a predetermined three-dimensional curved shape, and then bonding said heat-treated glass substrate having an antireflection film to another glass substrate by means of an intermediate film so that the antireflection film faces the interior of said transport.

42. The antireflection film on a window of a transport of claim 30, wherein the transport is an automobile.

43. The laminated glass for a window of a transport, which comprises the glass substrate provided with an antireflection film on a window of a transport of claim 36, heat-treated to have a predetermined three-dimensional curve shape, and having a second glass substrate bonded to said glass substrate by means of an intermediate film so that the antireflection film faces the interior of such transport.

44. The laminated glass provided with an antireflection film on a window of a transport according to claim 36, wherein the reflectance of visible light incident at an angle of 60° from the film face side is at most 11%.

45. A process for producing a laminated glass provided with an antireflection film on a window of a transport, which comprises heat-treating the glass substrate having an antireflection film for a window of a transport of claim 36 to form a predetermined three-dimensional curved shape, and then bonding said heat-treated glass substrate having an antireflection film to another glass substrate by means of an intermediate film so that the antireflection film faces the interior of said transport.

* * * * *